United States Patent
Meggiolan et al.

(10) Patent No.: US 10,392,074 B2
(45) Date of Patent: Aug. 27, 2019

(54) MANUAL CONTROL DEVICE FOR A BICYCLE, IN PARTICULAR OF HYDRAULIC BRAKE AND GEARSHIFT

(71) Applicant: Campagnolo S.r.l., Vicenza (IT)

(72) Inventors: Mario Meggiolan, Creazzo (IT); Davide Zenere, Vicenza (IT)

(73) Assignee: CAMPAGNOLO S.R.L., Vicenza (IT)

( * ) Notice: Subject to any disclaimer, the term of this patent is extended or adjusted under 35 U.S.C. 154(b) by 383 days.

(21) Appl. No.: 14/933,654

(22) Filed: Nov. 5, 2015

(65) Prior Publication Data
US 2016/0129966 A1  May 12, 2016

(30) Foreign Application Priority Data

Nov. 6, 2014   (IT) .............................. MI2014A1899
Aug. 7, 2015   (IT) ........................ 102015000043455

(51) Int. Cl.
*B62K 23/06* (2006.01)
*B62L 3/02* (2006.01)
(Continued)

(52) U.S. Cl.
CPC .............. *B62K 23/06* (2013.01); *B62K 23/02* (2013.01); *B62L 3/023* (2013.01); *B62M 25/08* (2013.01)

(58) Field of Classification Search
CPC ........ B62K 23/06; B62K 23/02; B62M 25/08; B62L 3/023
See application file for complete search history.

(56) References Cited

U.S. PATENT DOCUMENTS

| 4,921,081 A | 5/1990 | Chilcote |
| 5,813,501 A | 9/1998 | Terry, Sr. |

(Continued)

FOREIGN PATENT DOCUMENTS

| CH | 707040 A2 | 3/2014 |
| CN | 101024414 A | 8/2007 |

(Continued)

OTHER PUBLICATIONS

European Office Action for Application 15 191 461.1-1755 dated, Mar. 29, 2017.

(Continued)

*Primary Examiner* — Victor L Macarthur
(74) *Attorney, Agent, or Firm* — Volpe and Koenig, P.C.

(57) ABSTRACT

A manual control device having a support body extending longitudinally from a first part configured for fixing to bicycle handlebars to a second part generally opposite the first part; there being generally defined on the support body a rear surface on the first part for fixing to the handlebars, a front surface on the second part, an upper surface, a bottom surface, a proximal side surface and a distal side surface. The support body has a protuberance and a seat for a hydraulic assembly comprising a hydraulic cylinder defining a cylinder axis. An angle (ALFA), defined, in a section through a substantially middle longitudinal plane of the manual control device, between (i) a tangent to the upper surface of the support body in a region not involved in the protuberance and (ii) the axis (C) of the hydraulic cylinder of the hydraulic assembly is between 70° and 118°.

21 Claims, 10 Drawing Sheets

(51) Int. Cl.
*B62M 25/08* (2006.01)
*B62K 23/02* (2006.01)

(56) References Cited

U.S. PATENT DOCUMENTS

| | | | |
|---|---|---|---|
| 6,003,639 | A | 12/1999 | Buckley |
| 6,073,730 | A | 6/2000 | Abe |
| 8,272,292 | B2 | 9/2012 | De Perini |
| 8,464,844 | B2 * | 6/2013 | Jordan .................. B60T 7/102 |
| | | | 188/24.22 |
| 8,833,199 | B2 | 9/2014 | Dal Pra |
| 9,010,500 | B2 | 4/2015 | Uchida et al. |
| 9,233,730 | B2 | 1/2016 | Kariyama et al. |
| 9,365,260 | B2 | 6/2016 | Nago |
| 2005/0016312 | A1 | 3/2005 | Dal Prà |
| 2006/0086588 | A1 | 4/2006 | Tsumiyama |
| 2008/0210046 | A1 | 9/2008 | De Perini |
| 2009/0152062 | A1 | 6/2009 | Tsai |
| 2011/0048873 | A1 | 3/2011 | Wang |
| 2012/0240715 | A1 | 9/2012 | Tsai |
| 2013/0031998 | A1 | 2/2013 | Miki et al. |
| 2014/0174236 | A1 | 6/2014 | Nakakura et al. |
| 2014/0174237 | A1 | 6/2014 | Watarai et al. |
| 2014/0174244 | A1 * | 6/2014 | Watarai .................. B62M 25/00 |
| | | | 74/502.2 |
| 2015/0083531 | A1 | 3/2015 | Abhold et al. |
| 2016/0129966 | A1 | 5/2016 | Meggiolan et al. |
| 2016/0177976 | A1 | 6/2016 | Ruopp |
| 2016/0264213 | A1 * | 9/2016 | Swanson ................. B62L 3/023 |

FOREIGN PATENT DOCUMENTS

| | | |
|---|---|---|
| CN | 102758974 A | 10/2012 |
| CN | 102910240 A | 2/2013 |
| CN | 103373437 A | 10/2013 |
| CN | 203511953 U | 4/2014 |
| CN | 103847923 A | 6/2014 |
| CN | 103895803 A | 7/2014 |
| EP | 0878383 A2 | 11/1998 |
| EP | 1473220 A1 | 11/2004 |
| EP | 1964761 A2 | 9/2008 |
| EP | 1964763 A1 | 9/2008 |
| EP | 2615020 A2 | 7/2013 |
| EP | 2749484 A1 | 7/2014 |
| EP | 2749487 A1 | 7/2014 |
| EP | 2749488 A1 | 7/2014 |
| EP | 2759462 A1 | 7/2014 |

OTHER PUBLICATIONS

Extended European Search Report for Application No. 15191461.1, dated Mar. 22, 2016.
Italian Search Report and Written Opinion in Italian Application No. IT MI2014A001899, with English translation.
Chinese Office Action issued in corresponding Chinese Application No. 201510752636.6 dated Feb. 2, 2019, with English translation.
Chinese Office Action issued in corresponding Chinese Application No. 201510752279.3, dated Mar. 1, 2019.

* cited by examiner

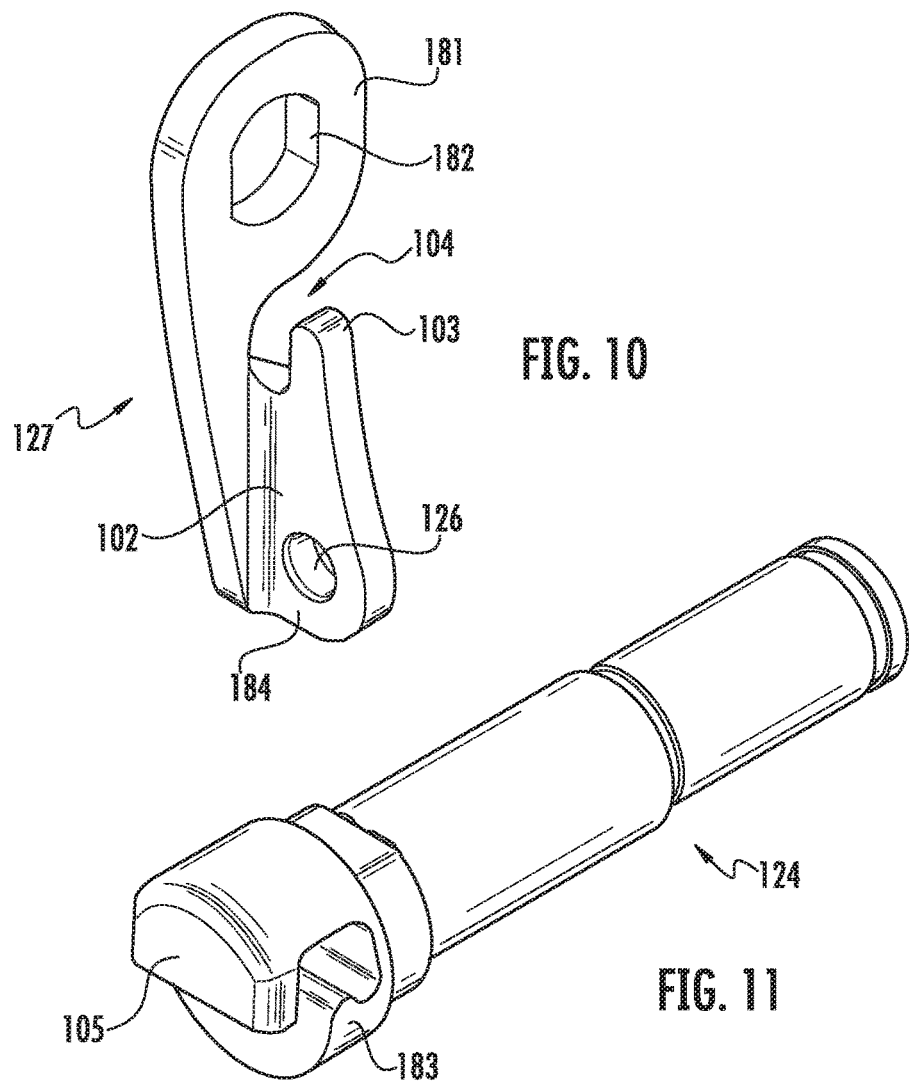

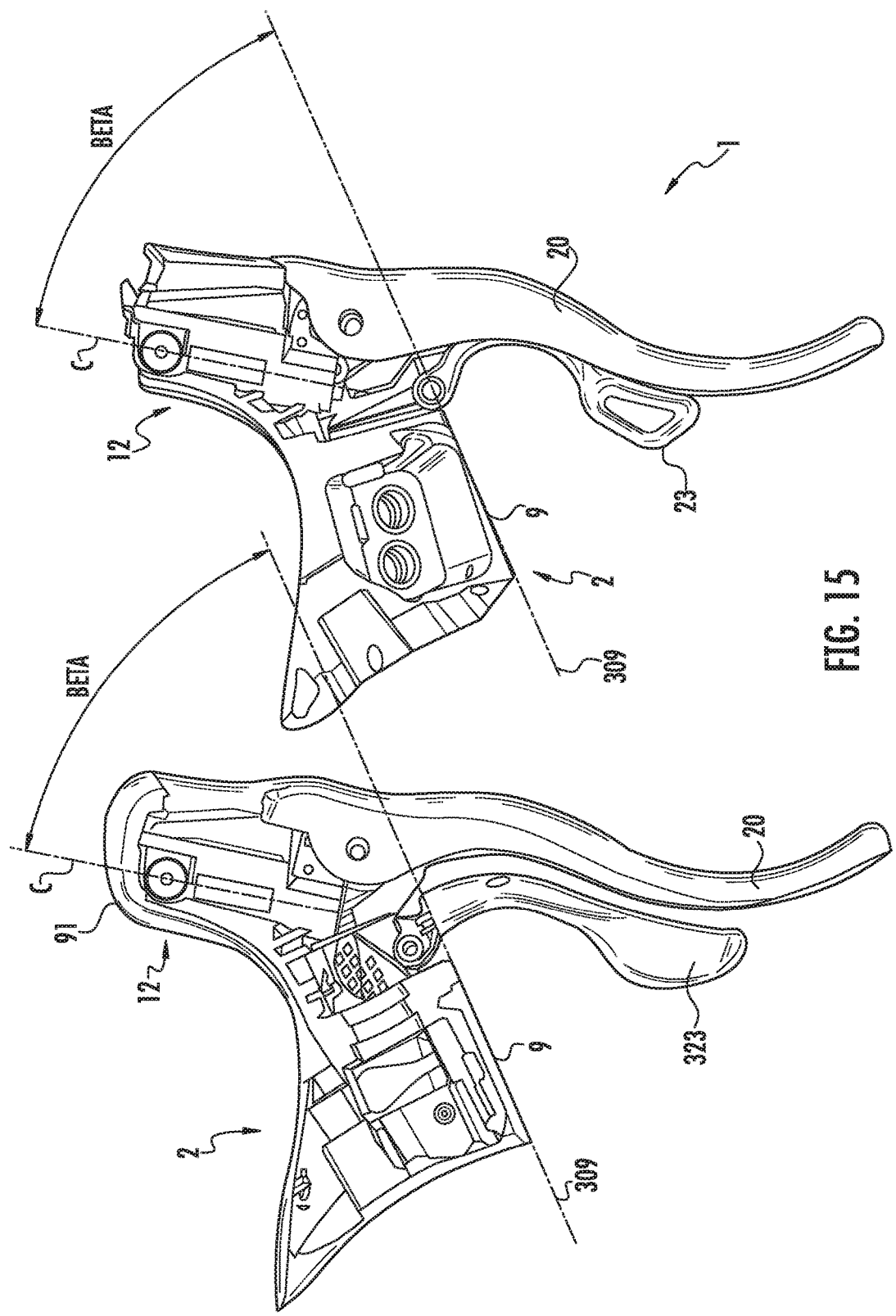

MANUAL CONTROL DEVICE FOR A BICYCLE, IN PARTICULAR OF HYDRAULIC BRAKE AND GEARSHIFT

CROSS REFERENCE TO RELATED APPLICATIONS

This application claims the benefit of Italian Application No. MI2014A001899, which was filed on Nov. 6, 2014 and Italian Application No. 102015000043455, which was filed on Aug. 7, 2015, both of which are incorporated herein by reference as if fully set forth.

FIELD OF INVENTION

The present invention relates, in general, to a manual control device for a bicycle.

The present invention relates more in particular, to a device for imparting a command to at least one hydraulic equipment and to at least one other mechanical, electromechanical, electronic or electric bicycle equipment.

The hydraulic equipment is in particular a hydraulic brake or a hydraulic suspension or a hydraulic seat post.

The other equipment is in particular a gearshift or a derailleur thereof, a cycle-computer, a lighting or luminous signalling device, a suspension or a seat post.

BACKGROUND

Known manual control devices for a bicycle comprise one or more manual actuation members, of the lever or small lever type, namely rigid bodies actuated with a rotary movement about a pivot or fulcrum, or of the button type, namely actuated with a linear movement, said manual actuation members being actuatable with one finger or with plural fingers. Typically, the manual actuation members are supported by a support body suitable for fixing at a grip portion of the handlebars.

In the case of manual control devices for imparting at least one electrical-electronic command (in the case of electromechanical, electronic or electric equipment), the manual actuation members typically act on respective electric switches, of the microswitch type, each including a deformable dome-shaped diaphragm. In order to switch the switches, an actuation head of or connected to the respective manual actuation member faces the deformable diaphragm in the rest condition of the manual actuation member, and acts by pushing on the deformable diaphragm in the actuation condition of the manual actuation member.

In greater detail, a bicycle is typically equipped with a rear brake associated with the rear wheel and/or a front brake associated with the front wheel, each of which is controlled by a manual actuation member, typically by a brake lever pivoted to a support body to actuate the brake when it is pulled towards the handlebars.

In particular, in high-performance bicycles, it is becoming increasingly common—as an alternative to the actuation of the brake through traction by the brake lever of a sheathed inextensible cable (Bowden cable)—to use hydraulic braking systems, wherein the force exerted by the cyclist's hand on the brake lever is suitably transferred to a hydraulic assembly housed in the support body and connected through suitable ducts to the braking members. A hydraulic fluid is put under pressure in the hydraulic assembly by the actuation of the brake lever and the pressure is transmitted to the braking members causing, for example, the clamping of jaws around the rim of the wheel (rim brake) or on a hydraulic cylinder fixedly connected to the wheel (drum brake) or the pressing of pads against a disc fixedly connected to the wheel (disc brake).

As stated above, the hydraulic assembly can moreover be used to actuate a different hydraulic equipment.

The hydraulic assembly in general comprises a hydraulic cylinder, a piston slidable in the hydraulic cylinder, and a connection between the manual actuation member and the piston; it can further comprise a reservoir to compensate for variations in volume of the hydraulic fluid due to temperature variations, wearing of the parts, leaks, etc.; it can further comprise members for adjusting the rest position of the lever and/or the start-of-activation position of the hydraulic equipment.

In patent application EP 2749484A1, the hydraulic cylinder and the reservoir of the hydraulic assembly are made in one piece with the support body, in particular the support body provides for a substantially cylindrical cavity that defines the inner walls of the hydraulic cylinder.

A bicycle is also typically equipped with a motion transmission system, which comprises a chain extending between toothed wheels associated with the axle of the pedal cranks and with the hub of the rear wheel. When there is a set or pack of toothed wheels at at least one of the axle of the pedal cranks and the hub of the rear wheel, a gearshift is provided comprising a front derailleur and/or a rear derailleur to move the chain in engagement with a selected toothed wheel of the respective pack of toothed wheels in order to change the gear ratio.

In a per se known way, in the case of an electronically servo-assisted gearshift—briefly electronic gearshift—, the chain guide is moved through an electromechanical actuator and possibly a suitable linkage; the manual control device correspondingly comprises one or more electric switches to impart gearshifting request signals to a controller of the actuator. The switches are in turn controlled by one or more manual actuation members, which can be of lever or button type.

Again in a per se well known way, in the case of a mechanical gearshift, the chain guide is moved by a suitable linkage controlled through the traction and release of an inextensible cable, usually sheathed (Bowden cable); in the manual control device there is a mechanism for controlling the traction of the cable, typically comprising a cable-winding bush and an indexer to determine the rotation and the stopping of the cable-winding bush in predetermined positions—"indexed bush" or "bush-indexer assembly"—as well as one or more manual actuation members, typically of lever type, to control the bush-indexer assembly.

A bicycle can also be equipped with a cycle-computer or other electronic device, which can be at least partially controlled by one or more manual actuation members—typically of the button type—positioned on a manual control device.

Other bicycle equipments can comprise hydraulic, mechanical or electromechanical suspensions, adjustable seat posts, lighting devices such as front lights, luminous signalling devices such as turning indicators or presence indicators, which can also be at least partially controlled by one or more manual actuation members positioned on a manual control device.

In a typical configuration, two manual control devices—or only one of the two in the case of less equipped bicycles—are mounted so as to be easily manoeuvred by the cyclist, usually on the handlebars, close to the handgrips thereof.

Each manual control device typically allows the control both of a brake—typically the front brake through the left manual control device, and the rear brake through the right manual control device—and of the gearshift. In some configurations, the left manual control device allows control in the two directions of the front derailleur, and the right manual control device allows control in the two directions of the rear derailleur. In other electronic gearshift configurations, one or the two manual control devices can be used to impart a command to increase the gear ratio and a command to reduce the gear ratio, the controller of the actuators suitably driving the front and/or rear derailleur depending on circumstances.

Manual control devices must be as ergonomic as possible to allow the cyclist to have easy actuation of their manual actuation members when he/she grips the handlebars—a condition that will be indicated hereinafter as first travel condition.

Moreover, in the case of curved handlebars for racing bicycles (drop bar), the support body—which in this case extends projecting forwards in the travel direction from the handlebars—is typically configured to provide the cyclist with an alternative grip to gripping the handlebars, a grip that must allow him/her to guide the bicycle and simultaneously actuate the manual actuation members supported thereby—a condition that will be indicated hereinafter as second travel condition.

Manual control devices for such drop bar handlebars are sometimes provided with a protuberance at the top of the part furthest from the handlebars, which should in general allow the hand of the cyclist to be stopped so that it does not slip forwards when the support body is gripped in the second travel condition. In some manual control devices, the protuberance itself is sized and configured so as to provide the cyclist with a further grip—in a condition that will be indicated hereinafter as third travel condition; in this case it is also desirable for the geometry of the manual control device to be such as to allow the bicycle to be guided and simultaneously at least the brake lever to be actuated.

EP 1964763A1 corresponding to U.S. Pat. No. 8,272,292 discloses a manual control device of a mechanical brake and of an electronic gearshift (or other electric, electronic or electromechanical equipment) for drop bar handlebars, comprising a support body provided with a protuberance that can be gripped in the aforementioned terms. The support body carries at least one switch, a respective actuation element and a respective manual actuation member. The manual control device comprises a transmission mechanism arranged between the manual actuation member and the actuation element.

Through the provision of the transmission mechanism for transmitting the movement of the manual actuation member to the actuation element of the switch, the switch can be displaced in an area further inside the control device, less exposed to the external environment. More in particular, a switch unit is partially received inside a cavity of the support body, the transmission mechanism comprises a shaft rotatably supported in the support body, the manual actuation member is in the form of a lever associated with a first end of the shaft, and the shaft has a transversal protuberance in the form of a hammer acting on the switch at a second end.

EP 2749484A1 cited above discloses a manual control device of a hydraulic brake and of a mechanical gearshift for drop bar handlebars comprising a support body extending longitudinally between a first side provided for fixing to the handlebars and a second side, and having a protuberance at the top of the second side that cannot be gripped, namely not configured to allow the aforementioned third travel condition. In order to allow the aforementioned second travel condition wherein the cyclist grips the support body, the document provides that the hydraulic cylinder of the hydraulic assembly is formed in the support body closer toward the second side of the support body with respect to the control mechanism of the gearshift and defines a hydraulic cylinder axis forming an angle comprised between 20° and 50° with the axis of the cable-winding bush. In this way, the increase in size of the support body is minimized still allowing the hydraulic cylinder to be inclined, rather than perpendicular, with respect to the brake lever so as to be able to be easily actuated by the latter.

The Applicant observes that firstly, in the aforementioned second travel condition, the cyclist risks losing grip on the support body of such a manual control device because the palm of the hand can slip forwards on the upper surface of the support body. Indeed, although the hydraulic assembly generates a small protuberance, this is not sufficient to stop the hand of the cyclist. Moreover, as already stated, the protuberance of such a document cannot be gripped, namely the manual control device is not configured to allow the aforementioned third travel condition.

The technical problem at the basis of the invention is to avoid such a drawback by making a manual control device for a bicycle for imparting a command to at least one hydraulic equipment of a bicycle, which is particularly ergonomic and which in particular effectively provides the aforementioned three travel conditions.

SUMMARY OF THE INVENTION

The technical problem is solved through a manual control device comprising a support body extending longitudinally from a first part provided for fixing to bicycle handlebars to a second part generally opposite the first part, there being generally identified on the support body a rear surface on the first part for fixing to the handlebars, a front surface on the second part, an upper surface, a bottom surface, a proximal side surface and a distal side surface, the support body having a protuberance on the second part, at the top, which can be gripped, the support body having a seat for a hydraulic assembly comprising a hydraulic cylinder defining a cylinder axis, the seat for the hydraulic assembly being formed in said protuberance.

An angle, defined, in a section through a substantially middle longitudinal plane of the manual control device, between (i) a tangent to the upper surface of the support body in a region not involved in the protuberance and (ii) the axis of the hydraulic cylinder of the hydraulic assembly is selected in the range comprised between 70° and 118°, preferably between 80° and 108°, even more preferably it is selected equal to 94°.

BRIEF DESCRIPTION OF THE DRAWINGS

Further features and advantages of the present invention will become clearer from the following detailed description of some preferred embodiments thereof, made with reference to the attached drawings. The different features illustrated and described with reference to the individual configurations can be combined with each other as desired. In the following description, for the illustration of the figures, identical or similar reference numerals will be used to indicate constructive or functional elements with the same function or an analogous function. In the drawings:

FIG. 10 illustrates an alternative embodiment of an arm of a transmission mechanism of the manual control device of FIG. 1;

FIG. 11 illustrates, in perspective, an alternative embodiment of a shaft of a transmission mechanism of the manual control device of FIG. 1;

FIG. 12 illustrates a side view of the shaft of FIG. 11;

FIG. 15 illustrates the right manual control device of FIG. 13 and that of FIG. 2, the second without a cover, in a section through a substantially middle longitudinal plane and highlighting another characteristic angle;

DETAILED DESCRIPTION OF THE PREFERRED EMBODIMENTS

Figure 1:
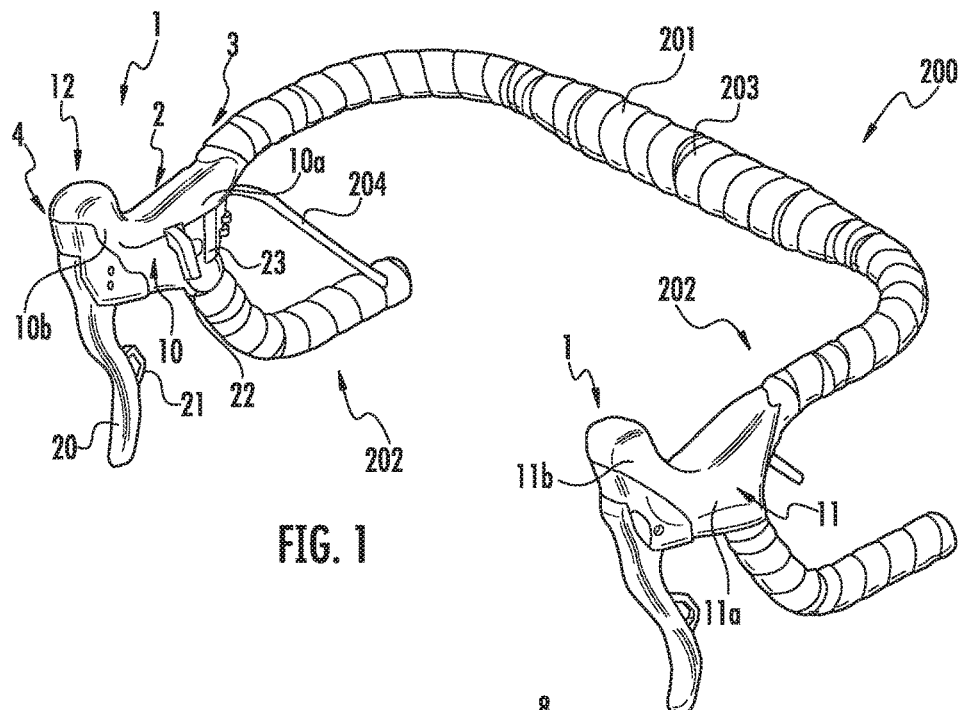
FIG. 1 illustrates bicycle handlebars with a pair of manual control devices mounted.

In the present description and in the following claims, under protuberance "that can be gripped" it is meant to indicate that it is configured protruding sufficiently upwards and of transversal dimensions such as to allow a travel condition wherein the cyclist guides the bicycle by gripping the protuberance.

In the present description and in the following claims, all of the numerical magnitudes indicating quantities, parameters, percentages, and so on should be considered preceded in all circumstances by the term "about" unless otherwise indicated. Moreover, all of the ranges of numerical magnitudes include all of the possible combinations of maximum and minimum values, and all possible intermediate ranges, besides those specifically indicated hereinafter.

Such values of the angle considered herein make it possible to make the protuberance markedly jutting from the rest of the upper surface of the support body. The upper surface takes up a saddle-like configuration, and the protuberance manages very well to perform the role of stopping the hand against sliding forwards in the second travel condition (when the support body is gripped). Differently, for angles greater than the values of such a range, the hydraulic cylinder would be very inclined forwards and not very effective from this point of view. For angles smaller than the values of such a range, the protuberance would "close up" too much on the upper surface, not leaving enough space for the palm of the hand in the second travel condition and/or bothering the cyclist.

Preferably an angle, defined, in a section through a substantially middle longitudinal plane of the manual control device, between (i) a tangent to the bottom surface of the support body in a region not involved in the protuberance and (ii) the axis of the hydraulic cylinder of the hydraulic assembly is selected in the range comprised between 40° and 68°, preferably between 46° and 63°, even more preferably it is selected equal to 54.4°.

The considerations outlined for the first angle considered are substantially equally valid for the angle under consideration herein, of course in reverse in the sense that for angles with the bottom surface of the support body smaller than the values of such a range, the hydraulic cylinder would be very inclined forwards and not very effective as a stop for the hand, while for angles greater than the values of such a range, the protuberance would "close up" too much on the upper surface.

Moreover, considering that for easy actuation of the hydraulic assembly through an associated manual actuation member it is preferable for the axis of the hydraulic cylinder to be almost parallel to the longitudinal direction of such a manual actuation member, the values of such a range allow correct positioning of the manual actuation member in relation to the handgrip of the handlebars, and therefore facilitate the guiding of the bicycle and the actuation of the hydraulic equipment from the first travel condition (when the handgrip is gripped).

A manual control device wherein the angle considered herein has the indicated values should be considered inventive per se, irrespective of the values of the angle considered previously.

Preferably, a height, defined in a section through a substantially middle longitudinal plane of the manual control device, between (i) the tangent to the upper surface in the region not involved in the protuberance and (ii) the top of the protuberance itself is selected in the range comprised between 38 and 64 millimeters, preferably between 43 and 59 millimeters, even more preferably it is selected equal to 50.9 millimeters.

Such values make it possible to make the protuberance protruding from the rest of the upper surface of the support body by such an amount as to allow it to be securely gripped in the aforementioned third travel condition. In particular, it is possible, by gripping the protuberance, to arrange one or two fingers (index finger and possibly middle finger) above the rotation axis of the manual actuation member associated with the hydraulic assembly, and the other ones below it, and thus easily actuate such a manual actuation member for example to brake. Differently, for heights smaller then the values of such a range, the protuberance would be too short and would not provide a region of the upper surface of the support body suitable for the palm to rest on and a secure grip, suitable for allowing the bicycle to be guided. For heights greater than the values of such a range, the protuberance would project too far up and would not be aerodynamic.

A manual control device wherein the height considered herein has the indicated values should be considered inventive per se, irrespective of the values for the angles considered previously.

Preferably, the hydraulic assembly is actuated through a manual actuation member rotatable with respect to the support body about an axis, and a radius that, in a section through a substantially middle longitudinal plane of the manual control device, has its origin on the axis and defines a circumference that is tangent to the top of the protuberance is selected in the range comprised between 43° and 73°, preferably between 49° and 67°, even more preferably it is selected equal to 58.2°.

The considerations outlined for the height considered above are also substantially valid for the radius considered herein. In particular, the radius considered herein defines the maximum distance between a finger resting on the protuberance in the third travel condition and a rotation pivot of the manual actuation member, a distance that must be exceeded by at least one other finger to allow the manual actuation member to be actuated, in particular to brake, from the third travel condition by resting such another finger beneath the pivot.

A manual control device wherein the radius considered herein has the indicated values should be considered inventive per se, irrespective of the values for the angles and/or for the height considered previously.

Preferably, such a radius is also the radius of curvature of the protuberance in a region at its top.

Preferably, the manual actuation member is of the lever type.

In embodiments, the manual control device further comprises a bush-indexer assembly for winding/unwinding a traction cable.

In other embodiments, the support body has a cavity arranged more on the first part than on the second part, wherein a switch is provided in the cavity, and a manual actuation member is arranged more on the second part than on the first part, a transmission mechanism being provided arranged between the manual actuation member and the switch, the transmission mechanism comprising a shaft rotatably supported in the support body.

According to an advantageous characteristic that also represents an innovative aspect per se of the manual control device disclosed herein, irrespective of the provisions indicated above, the support body has, at the seat for the hydraulic assembly, a projection projecting towards the outside of the support body beyond the hydraulic assembly when seated, and in particular projecting upwards.

Such a protruding projection advantageously allows the hydraulic assembly to be protected against knocks, in particular when the bicycle is inverted with the wheels facing up, for example to change a wheel, and rested on the ground with the saddle, and the control devices fixed to the handlebars touch the ground.

Preferably, such a projection is hook-shaped and also acts as hooking for a removable cover of the support body.

According to an advantageous characteristic that also represents an innovative aspect per se of the manual control device disclosed herein, irrespective of the provisions indicated above, the manual control device has a removable cover of the support body that is provided with a thickening or with an inner padding at its contact region with the hydraulic assembly.

Advantageously, such a thickening or padding protects the hydraulic assembly at the same time allowing it to project from the support body to be gripped for insertion and removal from the seat; by providing such a thickening or such a padding it is also possible to shape the outside of the cover in an ergonomic manner also at the hydraulic assembly.

Advantageously, such a thickening or inner padding hooks onto the protruding projection where provided for.

Preferably, said hydraulic assembly controls a hydraulic brake.

Preferably, said manual control device is further configured to control a gearshift of the bicycle or an electromechanical derailleur thereof or a cycle-computer.

Preferably, a further manual actuation member in the form of a lever is provided for the actuation of the hydraulic assembly, and the manual actuation member is partially housed in the further manual actuation member, more preferably also in actuation conditions of the further manual actuation member.

In another aspect, the invention concerns a manual control device comprising a support body extending longitudinally from a first part provided for fixing to bicycle handlebars to a second part generally opposite the first part, wherein the support body has a cavity arranged more on the first part than on the second part, wherein a switch is provided in the cavity, and a manual actuation member is arranged more on the second part than on the first part, a transmission mechanism being provided arranged between the manual actuation member and the switch, the transmission mechanism comprising a shaft rotatably supported in the support body, to a first end of which the manual actuation member is connected, and having a projection acting on the switch at a second end.

The support body further has a seat for a hydraulic assembly and the transmission mechanism further comprises a connection arm of the first end of the shaft to the manual actuation member.

In the rest of the present description and in the following claims, the terms: front, rear, upper or top, lower or bottom, side, distal, proximal, and similar will be used to indicate geometric and structural elements of the manual control device and of the components comprising it that are thus oriented in the mounted and at rest condition thereof and of bicycle handlebars. In particular, the terms distal and proximal are used with reference to the centre of the handlebars. The terms outer, inner and similar will be used with reference to the centre of the manual control device.

Through the provision of the transmission mechanism for transmitting the movement of the manual actuation member to the switch, the switch can still be positioned in an area further inside the control device, less exposed to the external environment. Through the provision of the connection arm instead of the direct connection provided in the cited document, it is possible to gain a degree of freedom in the design of the manual control device, and in particular to shorten the shaft and the manual actuation member so that they do not project in the typical protuberance of the support body, which therefore remains free to receive the hydraulic assembly, still maintaining ergonomic dimensions of the support body and of the protuberance.

Moreover, the provision of the connection arm can turn out to be advantageous even if the hydraulic assembly is replaced by a mechanical brake actuation device.

Preferably, the support body has a protuberance on the second part, at the top, which can be gripped, namely configured to protrude sufficiently upwards and of transversal dimensions such as to allow a travel condition wherein the cyclist guides the bicycle by gripping the protuberance.

Preferably, the seat for the hydraulic assembly is formed in said protuberance.

Preferably, the manual actuation member is of the lever type.

Preferably, the projection acts on the switch through a respective actuation element.

Preferably, the projection is transversal, more preferably in the form of a hammer.

Preferably, the arm rotates as a unit with the shaft.

Preferably, the arm extends radially with respect to the shaft.

Preferably, a first region of the arm is mounted on the first end of the shaft, the arm having a second region wherein a seat for coupling with the manual actuation member is formed.

Alternatively, the arm can be made in one piece with the shaft.

More preferably, the arm extends radially downwards, and the second region of the arm is lower with respect to the first region of the arm in the mounted condition.

Preferably, the first region of the arm is plate-shaped, extending substantially perpendicular to a longitudinal axis of the shaft.

In this way, the increase in size of the transmission mechanism in the longitudinal direction of the shaft is minimal.

More preferably, the first region of the arm comprises a plate of smaller dimensions than the dimensions of the support body transversally to the longitudinal axis of the shaft at the first end of the shaft itself, so as to remain housed in the support body.

Preferably, the second region of the arm is plate-shaped, extending substantially parallel to a longitudinal axis of the shaft.

In this way, the two regions of the arm are substantially perpendicular.

Preferably, the first region of the arm comprises a hole for fitting the shaft.

More preferably, the fitting hole for the shaft on the first region is non-circular to transmit a rotation to the shaft around the longitudinal axis of the shaft.

Preferably, the coupling seat in the second region of the arm is a hole for housing a pivot, and the manual actuation member is a lever pivoted on such a pivot to be adapted for a rotary movement not interacting with said switch.

In this way, the lever, in particular a gearshift lever, can follow a rotation of a further lever provided for the actuation of the hydraulic assembly, in particular of a brake lever.

Preferably, a further manual actuation member in the form of a lever is provided for the actuation of the hydraulic assembly, and the manual actuation member is partially housed in the further manual actuation member, more preferably also in conditions of actuation of the further manual actuation member.

In this way, the manual actuation member intended for the actuation of the switch is as shielded as possible and the risk of accidental actuation thereof is reduced. In particular, it can be totally shielded by the support body and by the further manual actuation member, apart from a region thereof on which to rest the fingers.

Preferably, the shaft has, at its first end, a seat for an end of a return spring, the return spring being operatively arranged between the shaft and the support body, to keep the shaft and the manual actuation member coupled therewith thrust towards a rest position with respect to the rotation about the longitudinal axis of the shaft. When the manual actuation member is actuated to command the switch, the cyclist counteracts the force of the return spring.

Preferably, a second return spring is arranged between the manual actuation member and the seat for coupling of the arm to keep the manual actuation member thrust, with respect to the rotation about the pivot of the manual actuation member, towards a rest position.

Advantageously, the rest position is at the rear and adjacent to the further lever provided for the actuation of the hydraulic assembly.

Preferably, the shaft has a hook to hold the return spring and/or the second return spring.

FIG. 1 illustrates bicycle handlebars 200 with a pair of manual control devices mounted thereon. The handlebars 200 are intended to be mounted, in a per se well known way, on a front fork of a bicycle and are illustrated in the mounted orientation.

The bicycle is equipped for example with hydraulic disc brakes and with a transmission system provided with a gearshift having a front derailleur and a rear derailleur, not shown.

The handlebars 200 are of the drop bar type and comprise a handlebar rod 201 provided at its two ends with respective handgrips 202 extending downwards and curved, with the convexity facing forwards in the travel direction.

On the handlebars 200, at each handgrip 202 a manual control device 1 is mounted.

The two manual control devices 1 mirror one another with respect to the longitudinal middle plane of the bicycle, transversal to the handlebar rod 201 at its centre 203; hereinafter only the right manual control device will therefore be described except where otherwise indicated.

Figure 2:
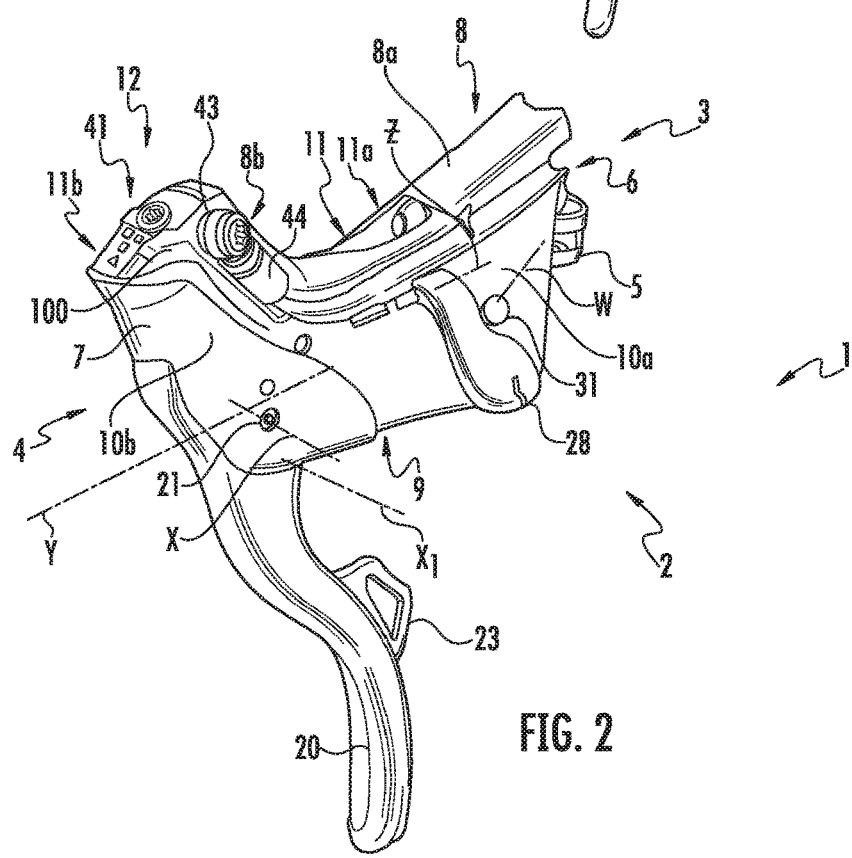
FIG. 2 illustrates the right manual control device of FIG. 1 mounted, without a cover.
Figure 3:
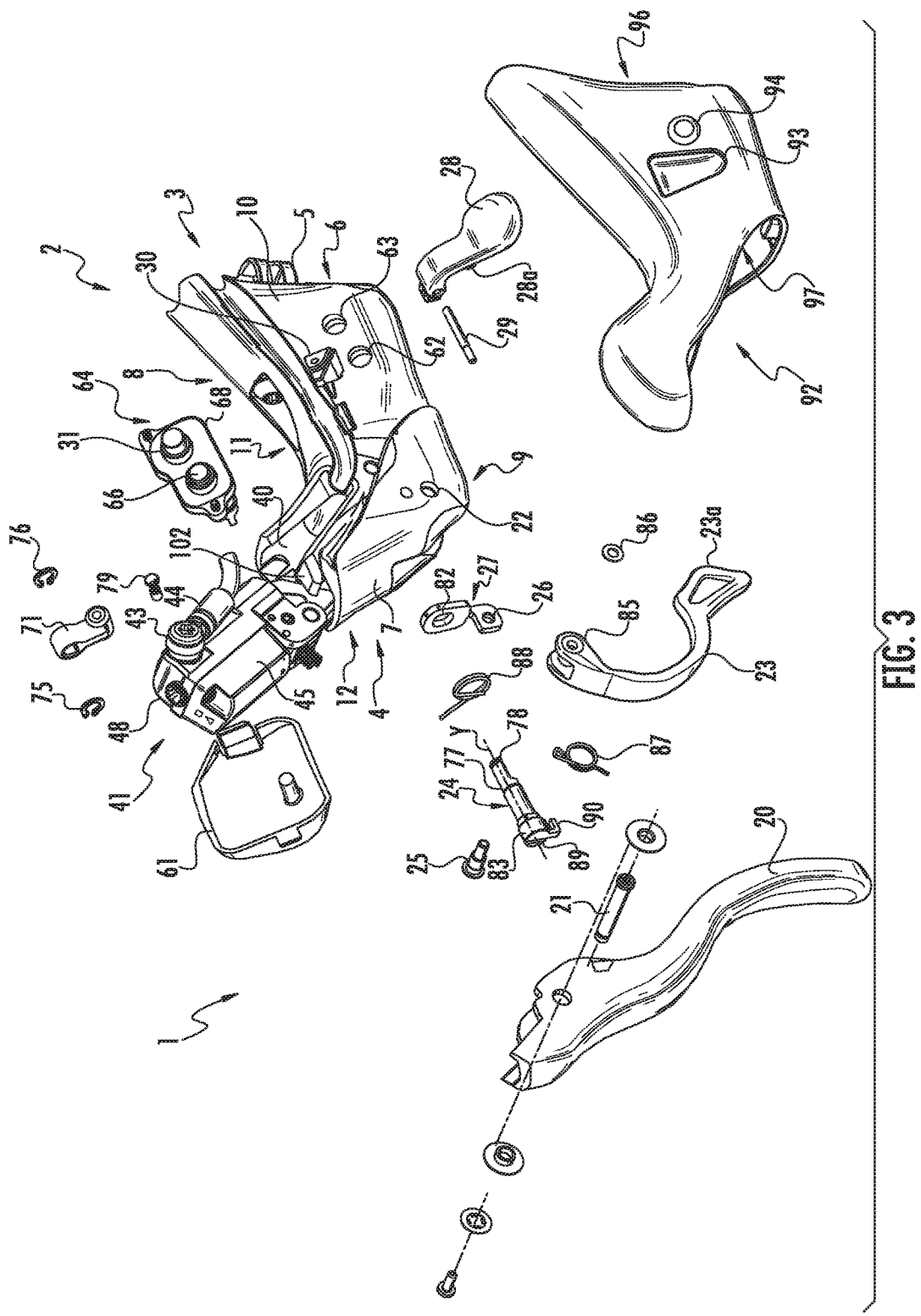
FIG. 3 illustrates the right manual control device of FIG. 1, partially exploded.

With reference also to FIGS. 2 and 3, the control device 1 comprises a support body 2 mounted canti-levered on the handlebars, generally projecting forwards in the travel direction, and extending longitudinally from a first part 3 provided for fixing to the handlebars 200 to a second part 4 generally opposite the first part 3. A strap 5 is shown for the fastening.

On the support body 2 it is possible to generally identify a rear surface 6 on the first part 3 for fixing to the handlebars, a front surface 7 on the second part 4, an upper surface 8, a bottom surface 9, a proximal side surface 10 facing towards the centre 203 of the handlebars 200, and a distal side surface 11 opposite the proximal side surface 10. The aforementioned surfaces are in general curved and provided with various recesses, holes and projections that are negligible for the purposes of their identification.

The support body 2 has a protuberance 12 at the top of the second part 4.

A first manual actuation member 20 in the form of a first lever 20 is pivoted about a first axis X to the support body 2 on the second part 4, beneath the protuberance 12 and hangs downward in front of the handgrip 202. The axis X is defined by a first rotation pivot 21 of the first lever 20 extending in holes 22 (only one of which is visible) of the support body. The remaining detail components of the mounting of the first lever 20 are not numbered for the sake of simplicity, being per se conventional.

The first lever 20, as better described hereinafter, is provided for the actuation of the brake (rear one in the case of the right manual control device, front one in the case of the left manual control device) through a hydraulic fluid. A duct 204 for the hydraulic fluid is shown extending from the control device 1. The first lever 20 could alternatively actuate a different hydraulic equipment.

A second manual actuation member 23 in the form of a second lever 23 is pivoted about a second axis Y to the support body 2 in the region towards its second part 4, beneath the protuberance 12, and also hangs downwards in front of the handgrip 202. The axis Y is defined by a shaft 24 of a transmission mechanism 70 better described later on, extending through the support body 2 in a direction substantially perpendicular to the direction of the first axis X.

The second lever 23 extends right behind the first lever 20. The second lever 23 is capable of following the rotation of the first lever 20 being preferably pivoted also about a third axis X1 parallel to the first axis X. The second lever 23 is shown shorter than the first lever 20, but this is not strictly necessary. The axis X1 is defined by a second pivot 25 extending in a hole 26 of an arm 27 of the transmission mechanism 70.

Preferably, the first lever 20 has a substantially U-shaped cross section, and the second lever 23 is partially housed in the first lever 20, more preferably also when the first lever 20 is rotated. In this way the second lever 23 is as shielded as possible, and the risk of accidental actuation thereof is reduced. In particular, the second lever 23 is totally shielded by the support body 2 and by the first lever 20, except for a region 23a thereof on which the fingers rest (see also FIG. 4).

The second lever 23, as better described hereinafter, is provided to impart at least one command to another equipment of the bicycle, in particular one of the commands that can be imparted to a gearshift, for example—in the case of the right manual control device 1—the command to move a rear derailleur towards larger toothed wheels of a pack of toothed wheels associated with the rear wheel ("upward gearshifting").

In the manual control device 1 shown, a third manual actuation member 28 in the form of a small third lever 28 is pivoted about a fourth axis Z to the support body 2 on its proximal side surface 10. The axis Z is defined by a third pivot 29 extending in holes 30 of the support body 2, only one of which is visible in FIG. 3.

The third manual actuation member 28 is provided to impart another command to an equipment of the bicycle, in particular the command to move the rear derailleur towards smaller toothed wheels of the pack of toothed wheels associated with the rear wheel ("downward gearshifting").

Furthermore, it is possible—as shown—to provide for a fourth manual actuation member 31 in the form of a button 31 reaching on the proximal side surface 10 of the support body 2, and acting in the direction of a fifth axis W.

The fourth manual actuation member 31 is provided to impart another command to an equipment of the bicycle, in particular a command of selection of the operative mode of an electronic controller for managing the gearshift.

In some cases, the second lever 23 can be provided to impart two commands, for example also the downward gearshifting command. In this case, the third manual actuation member 28 can be left out. The distinction between the two upward and downward gearshifting commands can for example take place based on the direction of rotation of the second lever 23 or on the amount by which it is moved.

In other manual control devices 1, such a second command of the gearshift can be imparted through the rotation about another axis of the first lever 20.

In a first travel condition, the cyclist grips the handgrip 202 of the handlebars 200, namely he/she rests the palm of his/her hand on the tube of the handgrip 202 on the side of its concavity and holds the thumb on one side of the tube and the other fingers on the other side of the tube, closing at least some of the fingers so as to grip on the handlebars and be able to guide the bicycle with the necessary safety.

In this first travel condition, the cyclist can actuate the first lever 20 pulling it towards the handlebars 200 about the first axis X with one or more of the fingers other than the thumb; the second lever 23 by pushing it in proximal-to-distal direction, namely generally towards the centre of the handlebars 200 about the second axis Y with one or more of the fingers other than the thumb; the third manual actuation member 28 by pushing it generally downwards about the third axis Z with the thumb; the fourth manual actuation member 31 by pushing it generally towards the support body 2 along the fourth axis W with the thumb.

In a second travel condition, the cyclist grips the support body 2, namely he/she rests the palm of his/her hand on the upper surface 8 in the region 8a not involved in the protuberance 12 and holds the thumb on the side of the proximal side surface 10 in the region 10a not involved in the protuberance 12, and the other fingers on the side of the distal side surface 11 in the region 11a not involved in the protuberance 12, closing at least some of the fingers so as to grip on the support body 2 and be able to guide the bicycle with the necessary safety.

In this second travel condition, the protuberance 12 advantageously avoids the hand of the cyclist slipping forwards losing the grip on the support body 2.

In this second travel condition, the cyclist can easily actuate all four of the manual actuation members 20, 23, 28, 31 in the aforementioned manner.

The protuberance 12 can be gripped, namely configured protruding sufficiently upwards and of transversal dimensions such as to allow a third travel condition wherein the cyclist guides the bicycle by gripping the protuberance 12.

In the third travel condition, the cyclist grips the protuberance 12, namely he/she rests the palm of his/her hand on the upper surface 8 in the region 8b involved in the protuberance 12, and holds the thumb on the side of the proximal side surface 10 in the region 10b involved in the protuberance 12, and the other fingers on the side of the distal side surface 11 in the region 11b involved in the protuberance 12, closing at least some of the fingers so as to grip on the protuberance 12 and be able to guide the bicycle with the necessary safety.

In this third travel condition, the cyclist can actuate the first lever 20 in the aforementioned manner and thus, in particular, he/she is able to brake, even if he/she can have some difficulty in actuating the other manual actuation members 23, 28, 31.

Figure 4:
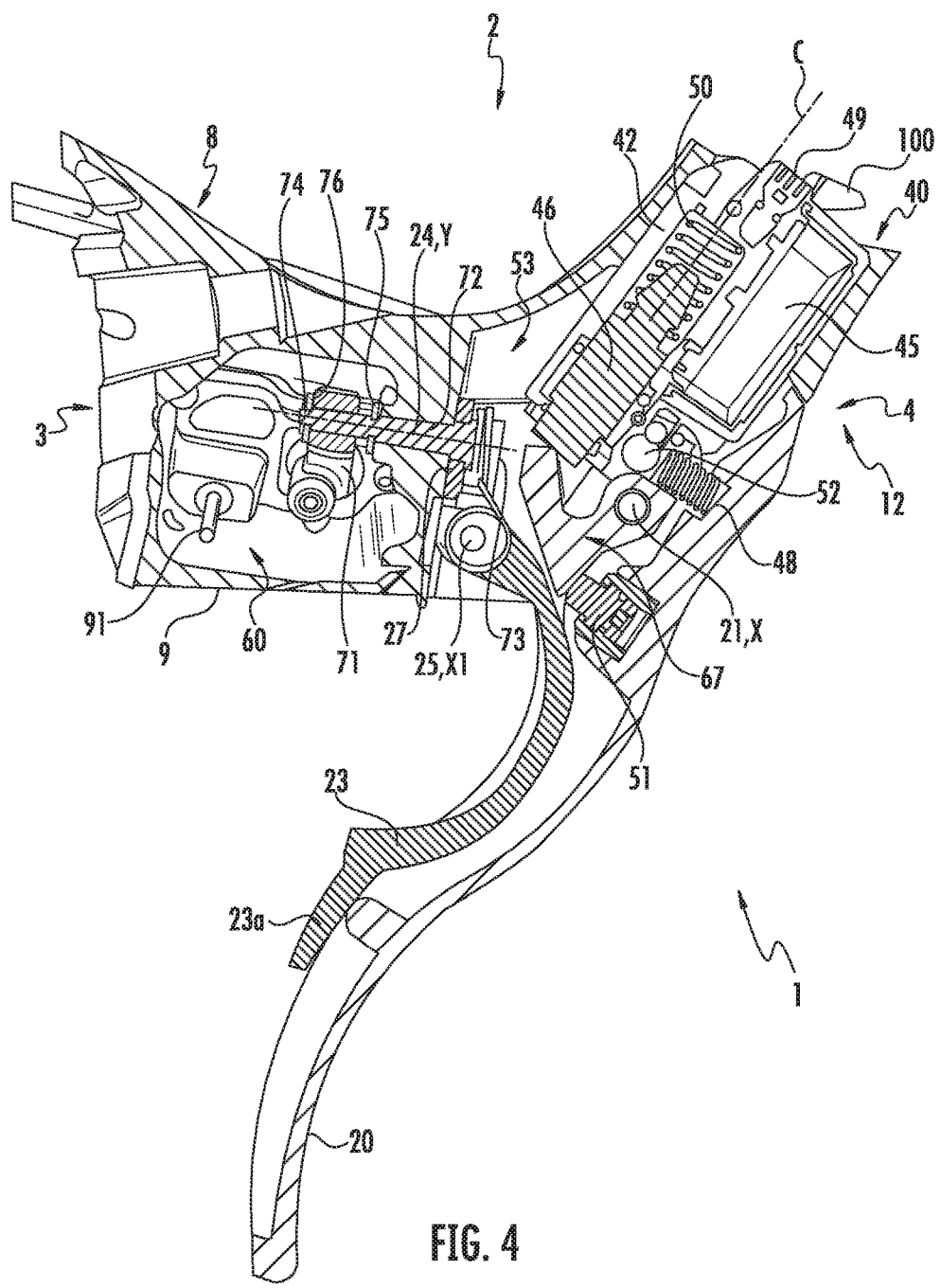
FIG. 4 illustrates the right manual control device of FIG. 1, without a cover, in a section through a substantially middle longitudinal plane.
Figure 5:
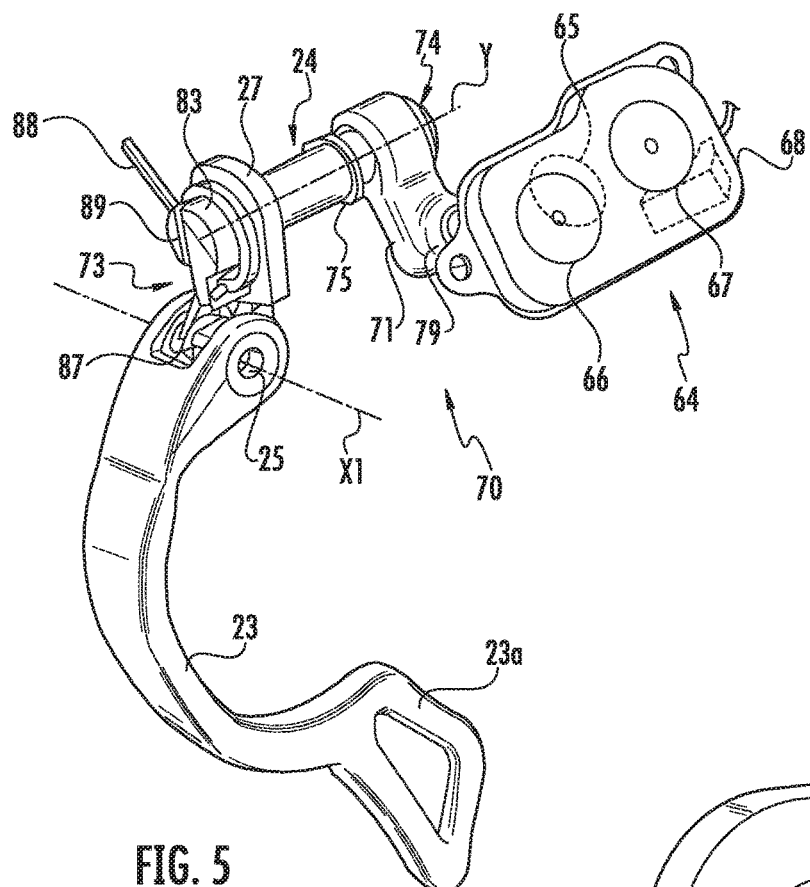
FIG. 5 illustrates a perspective view of some components of the right manual control device of FIG. 1, which define a kinematic chain from a manual actuation member to a switch.

With reference in particular to FIGS. 2-4, the support body 2 has a first cavity 40, made in the protuberance 12 and open towards the top thereof. The first cavity 40 defines a seat for a hydraulic assembly 41. The hydraulic assembly 41 is actuated through the first lever 20 to command for example a hydraulic brake.

Preferably, the hydraulic assembly 41 is made as an autonomous cartridge 41. In the cartridge 41 a hydraulic cylinder 42 is formed. The hydraulic cylinder 42 is in fluid communication, through a side hole 43 and a hydraulic fitting 44, with the duct 204 that leads to the hydraulic equipment of the bicycle, for example to the hydraulic brake.

In the cartridge 41 a reservoir 45 for the hydraulic fluid is also preferably formed, in fluid communication with the hydraulic cylinder 42.

A piston 46 is slidable in a tight manner in the hydraulic cylinder 42. The piston 46 is pushed in the direction of insertion into the hydraulic cylinder 42 by the actuation of the first lever 20, to place the hydraulic fluid under pressure, and in this way command the hydraulic equipment. In the embodiment shown, the kinematic connection between the first lever 20 and the piston 46 is made by a cam 47.

In order to ensure the contact between the first lever 20 and the cam 47, a spring 48 is operatively arranged between them.

Advantageously, the cam 47 is pivoted on the support body 2 through the same pivot 21 as the first lever 20. In this way the position of the cartridge 41 in the seat 40 is moreover unequivocally defined.

The cam 47 is preferably substantially V-shaped so as to act on the piston 46 in a substantially axial direction, i.e. along an axis C of the hydraulic cylinder 42.

The pressure in the hydraulic fluid arrives, along the duct 204, at the hydraulic equipment, where it is used for example to command a brake caliper on a brake disc, in a per se known and not illustrated way.

The cartridge 41 is provided with an outer reloading/discharging hole, closed by a removable cap 49 and in fluid communication with the hydraulic cylinder 42 or with the reservoir 45 to reload hydraulic fluid or discharge air.

The cartridge 41 comprises a return spring 50 to take the first lever 20 back into the rest position, far from the handgrip 202. The return spring 50 is for example of the helical type and is preferably provided between the piston 46 and an inner wall of the hydraulic cylinder 42.

The cartridge 41 is preferably made of a different material with respect to the support body 2, and is generally made of a material of greater structural strength with respect thereto. The cartridge 41 is preferably made of a material suitable for withstanding pressurized oil and the rubbing of the gaskets of the piston 46 (for example a metallic material such as aluminium or steel), while the support body 2 is preferably made of a lighter material (for example a plastic or a composite material, formed from a matrix of polymeric material wherein structural fibres are included, such as carbon fibres or similar).

In order to allow adequate adaptation to the size of the hands of the cyclist and/or a desired degree of response promptness of braking, the cartridge 41 can further comprise adjustment members adapted for adjusting the rest position of the first lever 20 and/or the start-of-compression action position on the hydraulic fluid of the piston 46 in the cylinder 42.

The adjustment of the rest position of the first lever 20 is essentially carried out through an adjustment screw 51, which determines the rest position of the first lever 20 with respect to the cam 47.

The adjustment of the position of start of compression action on the hydraulic fluid of the piston 46 in the cylinder 42 is essentially carried out through a selector 52, which determines the position of the cam 47 with respect to the support body 2 in such a condition.

The first cavity 40 communicates with a second cavity 53 extending in the support body 2 on the second part 4, beneath the protuberance 12, from which the first lever 20 and the second lever 23 project downwards.

As an alternative to the aforementioned cartridge-like hydraulic assembly 41, the hydraulic assembly 41 could be integrated in the support body 2. In particular, the hydraulic cylinder 42 and the possible reservoir 45 could be made in one piece with the support body 2, in particular the support body 2 could provide a substantially cylindrical cavity that defines the inner walls of the hydraulic cylinder 42.

With reference in particular to FIGS. 3-6, the support body 2 has a third cavity 60, made more on the first part 3 than on the second part 4, namely close to the rear surface 5 of the support body 2. The cavity 60 opens on the distal side surface 11 of the support body 2, and is closed by a cover 61, suitably fixable to the support body 2, and preferably tight sealing.

The cavity 60 also communicates with holes 62, 63 open on the proximal side surface 10 of the support body 2.

The control device 1 comprises a switch unit 64 received inside the third cavity 60 of the support body 2.

The switch unit 64 comprises (FIG. 5) a first switch 65 actuated through the second manual actuation member or second lever 23 in the manner described hereinafter; a second switch 66 that, in the mounted condition, faces the hole 62 and is actuated through the third manual actuation member or third lever 28, in particular through a projection 28a thereof; and a third switch 67 that, in the mounted condition, faces the hole 63 and is actuated through the fourth manual actuation member or button 31.

More specifically, the switch unit 64 comprises a support plate 68 provided on a first side—distal in the mounted configuration—with the first switch 65 and on the other side—proximal in the mounted configuration—with the second 66 and third 67 switches. The switches 65, 66, 67 are preferably of the deformable dome-shaped diaphragm type, well known per se. For further details reference can in any case be made to the aforementioned document EP 1964763A1 (U.S. Pat. No. 8,272,292), incorporated herein by reference.

One and/or the other of the second 66 and the third 67 switches could in any case be absent, correspondingly to what was stated relative to the third and fourth manual actuation members 28, 31.

For the actuation of the first switch 65 through the second lever 23, in the manual control device 1 there is a transmission mechanism 70 arranged between them.

The transmission mechanism 70 comprises the aforementioned shaft 24, the aforementioned arm 27 and a projection 71 acting on the first switch 65.

The shaft 24 is rotatably supported in the support body 2, in a hole 72 that extends between the second cavity 53 and the third cavity 60. A first end 73 of the shaft 24, frontal in the mounted condition, projects in the second cavity 53 and a second end 74 of the shaft 24, rear in the mounted condition, projects in the third cavity 60.

The arm 27 is used for the connection of the first end 73 of the shaft 24 to the second manual actuation member 23.

The projection 71 is mounted on the second end 74 of the shaft 24 in such a manner as to rotate as a unit therewith, for example through a pair of Seeger rings 75, 76 extending in peripheral grooves 77, 78 of the shaft 24. In this way, the shaft 24 is also axially blocked with respect to the support body 2 in the direction generally forwards.

The projection 71 is preferably transversal to the shaft 24, more preferably it is in the form of a hammer.

The projection 71 can act on the first switch 65 through an actuation element 79.

The arm 27 is mounted on the first end 73 of the shaft 24 in a such manner as to rotate as a unit therewith.

Figure 6:
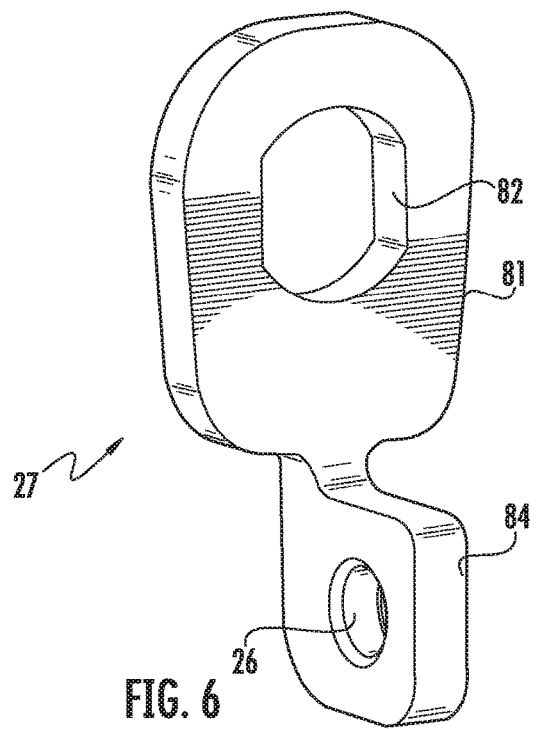
FIG. 6 illustrates a perspective view of an arm of a transmission mechanism part of the kinematic chain from a manual actuation member to a switch in the right manual control device of FIG. 1.
Figure 7:
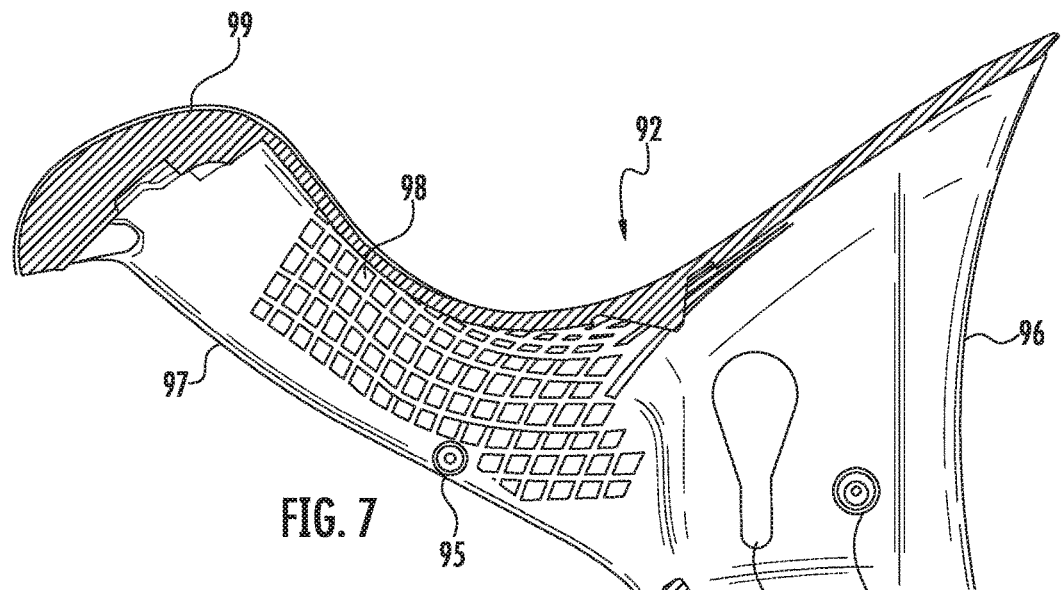
FIG. 7 illustrates a section view through a substantially middle longitudinal plane of a cover of a left manual control device of FIG. 1.
Figure 8:
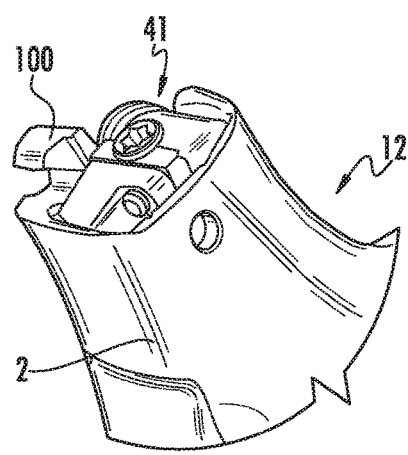
FIG. 8 illustrates a detail of a left manual control device of FIG. 1, without a cover.
Figure 9:
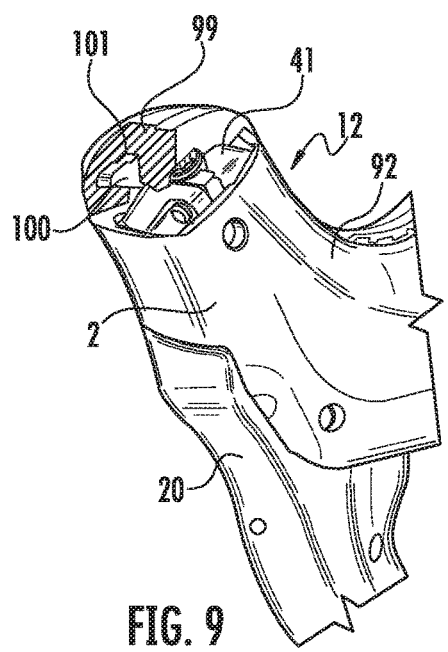
FIG. 9 illustrates a detail of a left manual control device of FIG. 1, with a cover mounted.

In the embodiment shown, see in particular FIG. 6, in a first region 81 of the arm 27 there is a hole 82 for fitting the shaft 24. Preferably, the fitting hole 82 for the shaft 24 is non-circular so as to transmit a rotation to the shaft 24 about the longitudinal axis Y of the shaft 24.

In the embodiment shown, the first region 81 of the arm 27 is plate-shaped, extending substantially perpendicular to the longitudinal axis Y of the shaft 24 in the mounted configuration.

In mounted condition, the first region 81 abuts against the support body 2 at the end of the hole 72 on the side of the second cavity 53, and abuts against a head 83 of the shaft 24. In this way, the shaft 24 is also axially blocked with respect to the support body 2 in the direction generally backwards.

With such a shape of the first region 81 of the arm 27, the dimensions of the transmission mechanism 70 are minimum in the longitudinal direction Y of the shaft 24, and in particular the projection of the transmission mechanism 70 in the second cavity 53 is minimum.

More preferably, the first region 81 of the arm 27 comprises a plate of smaller dimensions than the dimensions of the support body 2 transversal to the longitudinal axis Y of the shaft 24 at the end of the shaft 24 itself, so as to remain housed in the support body 2 and in particular in the second cavity 53.

In this way accidental actuation of the switch 65 is also avoided.

The arm 27 therefore, advantageously, extends radially with respect to the shaft 24.

More preferably, the arm 27 extends radially downwards in the mounted condition, and has a second region 84 that is lower with respect to the first region 81.

In the second region 84 of the arm 27 a seat for coupling the second manual actuation member or second lever 23 is made.

In the embodiment shown, the second region 84 of the arm 27 is also plate-shaped, extending substantially parallel to the longitudinal axis Y of the shaft 24. In this way, the two regions 81, 84 of the arm 27 are substantially perpendicular.

The coupling seat of the second lever 23 in the second region 84 of the arm 27 comprises, in the embodiment shown, the hole 26 in which, as stated above, there is housed the pivot 25 that allows the rotation of the second lever 23 about the third axis X1 to accompany the movement of the first lever or brake lever 20. During such rotary movement, there is no interaction with the first switch 65. The pivot 25 is held in holes 85 of the second lever 23 for example through a washer 86.

It is worthwhile emphasizing that the rotation of the second lever 23 about the axis Y is also possible during the actuation of the brake lever 20.

A return spring 87 is arranged between the manual actuation member 23 and the coupling seat 26 thereof in the arm 27 to keep the manual actuation member 23 thrust, with respect to the rotation about the pivot 25, towards a rest position. Advantageously, the rest position is at the rear and adjacent to the first lever 20 provided for the actuation of the hydraulic assembly, even more preferably partially housed in the U-shaped section of the first lever 20, with its region 23a on which the fingers rest protruding towards the handgrip 202 of the handlebars 200. When the first lever 20 is actuated for example for braking, the cyclist counteracts the force of the return spring 87, and also moves the second lever 23.

Alternatively, the second region 84 of the arm 27 and the second lever 23 could extend outside of the plane in which the first lever 20 moves, and in this case the second lever 23 could be fixed differently to the second region 84 of the arm 27, not having to follow the movement of the first lever 20.

Another return spring 88 is operatively arranged between the shaft 27 and the support body 2 to keep the shaft 27 and the second lever 23 coupled therewith thrust towards a rest position with respect to the rotation about the longitudinal axis Y of the shaft 24. When the second lever 23 is actuated to command the switch 65, the cyclist counteracts the force of the return spring 88 and/or return spring 87.

Preferably, the shaft has, at the head 83 at its first end 73, a seat 89 for an end of the spring 88, the second end going into abutment on a wall of the support body 2.

Preferably, the shaft 24 also has, at the head 83, a hook 90 to hold the spring 88.

The projection 71 projects from the shaft 24 in a predetermined angular position with respect to the arm 27 and to the second lever 23, such that, in the rest position of the second lever 23, it faces the first switch 65 without however activating it.

The connection through the arm 27 is such that the rotation of the second manual actuation member 23 in the direction generally from the distal side surface 11 of the support body 2 to the proximal side surface 10 causes the rotation in the same direction of the shaft 24 about its longitudinal axis Y, and therefore the pressing of the first switch 65 through the projection 71.

Through the provision of the connection arm 27, besides shortening the shaft 24 on the front side it is possible to shorten the second lever 23 at the top, with respect to the case in which the second lever 23 directly meets the shaft 24 to be directly connected thereto. Therefore, the second cavity 53 remains free, in the region adjacent to the first cavity 40, for receiving the hydraulic assembly 41, still maintaining ergonomic dimensions of the support body 2 and of the protuberance 12.

In an alternative embodiment, the projection 71 can be made in one piece with the shaft 24.

In another alternative embodiment, the arm 27 can be made in one piece with the shaft 24.

Between the shaft 24 and the hole 72 of the support body 2 there can be an anti-friction cylindrical bearing or a roller or ball bearing (not shown) and/or a sealing ring (not shown) at the front end of the hole 72, to make a tight seal between the second lever 23, exposed to the external environment, and the third cavity 60 of the support body 2, where the switches 65, 66, 67 are housed.

In the illustrated embodiment of the manual control device 1, the communication to the equipments of the bicycle of the control signals generated through the actuation of the switches 65, 66, 67 takes place via cable, cf. the cable 91. However, the communication could be wireless.

With reference in particular to FIGS. 3 and 7-9, the support body 2 of the control device 1 is partially covered by a removable cover 92. It should be noted that the cover 92 shown in FIG. 7 and the details shown in FIGS. 8 and 9 relate to a left manual control device, the mirror image of the right manual control device 1 described thus for.

The cover 92 can be made of rubber, plastics or light alloy.

The cover 92 has, at the third and fourth manual actuation members 28, 31, holes 93, 94 for the passage thereof, or regions having such characteristics of deformability as to allow each switch 66, 67 to be pushed therethrough.

The cover 92 also has a peg 95 for fastening to the support body 2.

The cover 92 has a rear opening 96 to let the rear surface 6 of the support body 2 free, and a front opening 97, wider than the opening of the second cavity 53 of the support body 2.

The cover 92 preferably has a structured surface in at least some regions thereof, as shown at 98 in the region on which to rest the palm of the hand in the second and in the third travel configuration described above, so as to improve the grip on the support body 2 and on the hand of the cyclist.

Preferably, the inner side of the cover 92, facing the support body 2, has a thickening 99, or an inner padding at the top of the protuberance 12 of the support body 2, namely at its contact region with the hydraulic assembly 41.

Advantageously, the thickening or padding 99 protects the hydraulic assembly 41, at the same time allowing it to project from the support body 2 to be gripped for insertion into and removal from the seat made in the cavity 40; by providing for such a thickening or padding 99 it is also possible to shape the outside of the cover 92 in an ergonomic manner also at the hydraulic assembly 41.

The support body 2 has, at the cavity 40 making the seat for the hydraulic assembly 41, a projection 100 or tooth projecting towards the outside of the support body 2 beyond the hydraulic assembly 41 when seated. In particular, the projection 100 projects upwards.

The projection 100 is shown at the proximal side surface 10 of the support body 2, but alternatively it can be made at the distal side surface 11.

The protruding projection 100 advantageously allows the hydraulic assembly 41 to be protected against knocks, in particular when the bicycle is inverted with the wheels facing up, for example to change a tyre, and rested on the ground with the saddle, and the manual control devices 1 fixed to the handlebars touch the ground.

Preferably, indeed, the cartridge 41 of the hydraulic assembly—when inserted in the seat 40—faces the outside of the support body 2. More preferably, the cartridge 41 comprises a grip portion accessible from the outside of the manual control device 2 when it is mounted on the handlebars 200.

Preferably, as illustrated, the projection 100 is hook-shaped and also acts as a hooking for the cover 92 of the support body 2, in particular at a recess 101 of its thickening or of its inner padding 99.

FIG. 10 shows an alternative embodiment of an arm 127 of the transmission mechanism 70, which is otherwise unchanged.

The arm 127 again has two plate-shaped regions 181 and 184, the first having the fitting hole 182 for the shaft 24, and the second having the hole 126 for the second lever 23.

The two regions 181 and 184 are again perpendicular to each other, but they are partially adjacent along a bending line 102.

The second region 184 extends slightly above the bending line 102, projecting up with a tooth 103. The first region 181 widens above the bending line 102, making a space 104 adjacent to the tooth 103. The space 104 and the tooth 103 are advantageously used for fastening the spring 87.

FIGS. 11-12 show an alternative embodiment of a shaft 124 of the transmission mechanism 70, which is otherwise unchanged.

The shaft 124 differs from the shaft 24 only in that in its head 183, the seat 189 for the end of the spring 88 is hook-shaped, and preferably covered, as shown, by a cantilevered region 105 of the head 183.

Moreover, the head 183 of the shaft 124 lacks the hook 90 for holding the spring 87 and/or the spring 88.

Figure 13:
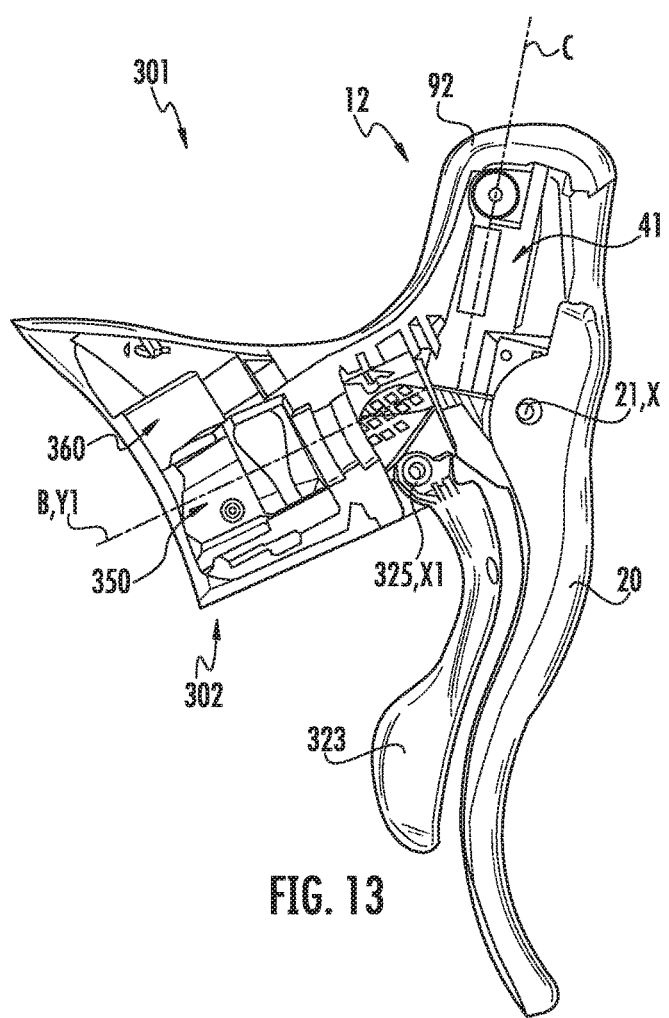
FIG. 13 illustrates a right manual control device according to a different embodiment, in a section through a substantially middle longitudinal plane.

FIG. 13 illustrates a right manual control device 301 according to a different embodiment of the present invention.

The manual control device 301 will be described in detail only relative to what differs from the manual control device 1 described above in detail. The components that are the same are identified by the same reference numerals, and those that are analogous are identified by reference numerals increased by 300.

The first manual actuation member 20 is unchanged and actuates the hydraulic assembly 41, also unchanged, to control for example a hydraulic brake.

The second manual actuation member 323 has a slightly different shape than that of FIG. 2. Its function, however, is unchanged, namely it is provided to impart at least one command to another equipment of the bicycle, in particular the upward gearshifting command to a rear derailleur of a gearshift.

In this case, however, the gearshift is of the mechanical type, wherein in each derailleur the chain guide is moved by a suitable linkage controlled through the traction and release of an inextensible cable, usually sheathed (Bowden cable).

In the manual control device 301 there is a mechanism for controlling the traction of the cable, or bush-indexer assembly or indexed bush, globally indicated with 350, typically comprising a cable-winding bush and an indexer to determine the rotation and the stopping of the cable-winding bush in predetermined positions.

The bush-indexer assembly 350 extends in a cavity 360 of the support body 302, present instead of the third cavity 60.

Various configurations of such bush-indexer assemblies are well known, and the present invention is not limited to any specific configuration, for which reason a detailed description of the bush-indexer assembly 350 is omitted.

The second manual actuation member 323 is operatively connected to the bush-indexer assembly 350 in such a way as to determine the rotation of the cable-winding bush in a direction, for example in the direction of winding of the Bowden cable.

The second manual actuation member 323 is rotatable about an axis Y1 coinciding with the axis B of the cable-winding bush of the bush-indexer assembly 350, or parallel thereto and slightly distanced therefrom.

The second manual actuation member 323 is also rotatable about an axis X1 defined by a pivot 325 to follow the movement of the first manual actuation member 20.

The third manual actuation member—not visible since arranged on the proximal side surface 10—is operatively connected to the bush-indexer assembly 350 in such a way as to determine the rotation of the cable-winding bush in the opposite direction, for example in the direction of unwinding of the Bowden cable.

The third manual actuation member is positioned on the support body and actuated in an analogous manner to the third manual actuation member 31 of FIG. 2.

In an alternative embodiment, the manual control device 301 can lack the third manual actuation member, the second manual actuation member 323 being used to command the rotation of the cable-winding bush in the two directions, this also in a per se well known way.

In the manual control device 301, the fourth manual actuation member 31 is absent, just as the switch unit 64 and the transmission mechanism 70 are also absent.

The manual control device 301 also allows the three travel conditions described above. In order to optimize the grip in such travel conditions, according to the present invention some provisions are adopted, described hereinafter.

Figure 14:
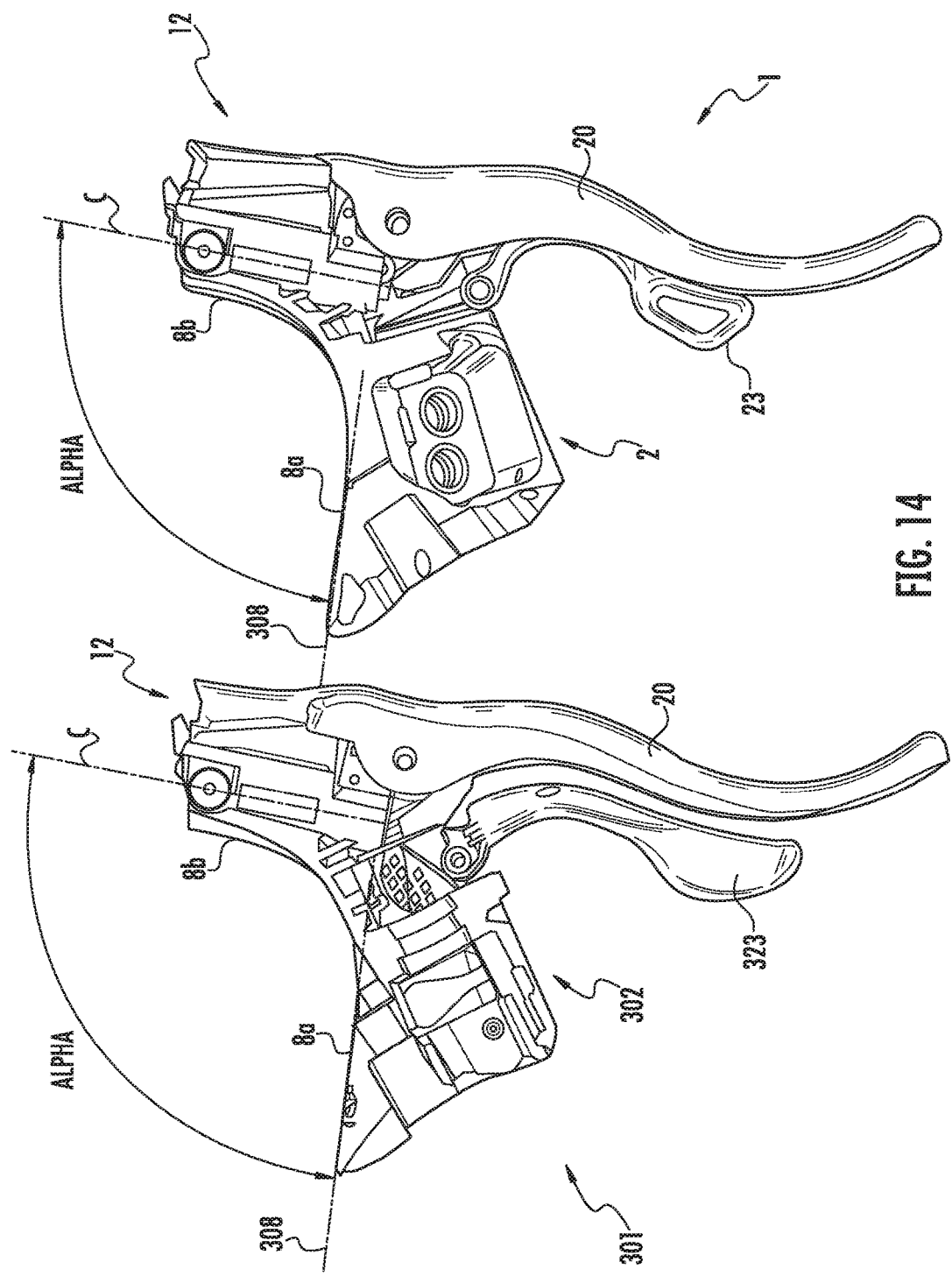
FIG. 14 illustrates the right manual control device of FIG. 13 and that of FIG. 2, without a cover, in a section through a substantially middle longitudinal plane and highlighting a characteristic angle.

FIG. 14 illustrates the right manual control device 1 of FIG. 13 and the right manual control device 301 of FIG. 2, without the cover in a section through a substantially middle longitudinal plane.

FIG. 14 highlights an angle ALFA, defined, in such a section through a substantially middle longitudinal plane of the manual control device 1, 301, between a tangent 308 to the upper surface 8 of the support body 2, 302 in the region 8a not involved in the protuberance, and the axis C of the hydraulic cylinder 42 of the hydraulic assembly 41.

According to the invention, the angle ALFA is selected in the range comprised between 70° and 118°, preferably between 80° and 108°. A particularly preferred value for the angle ALFA is 94°.

Such values allow the protuberance 12 to be made markedly jutting from the region 8a of the upper surface 8 of the support body 2, 302. The upper surface 8 takes up a saddle-like configuration, and the protuberance 12 manages very well to perform the role of stopping the hand against sliding forwards in the second travel condition (when the support body 2, 302 is gripped). Differently, for angles ALFA greater than the values of such a range, the hydraulic cylinder 42 would be very inclined forwards and not very effective from this point of view. For angles ALFA smaller than the values of such a range, the protuberance 12 would "close up" too much on the upper surface 8, not leaving enough space for the palm of the hand in the second travel condition and/or bothering the cyclist.

FIG. 15 is a view analogous to that of FIG. 14, except that the cover 91 of the manual control device 301 is also shown.

FIG. 15 highlights an angle BETA, defined, in such a section through a substantially middle longitudinal plane of the manual control device 1, 301, between a tangent 309 to the bottom surface 9 of the support body 2, 302 and the axis C of the hydraulic cylinder 42 of the hydraulic assembly 41.

According to the invention, the angle BETA is selected in the range comprised between 40° and 68°, preferably between 46° and 63°. A particularly preferred value for the angle BETA is 54.4°.

The considerations outlined for the angle ALFA are substantially also valid for the angle BETA, of course in reverse in the sense that for angles BETA smaller than the values of such a range, the hydraulic cylinder 42 would be very inclined forwards and not very effective as a stop for the hand, while for angles BETA greater than the values of such a range, the protuberance 12 would "close up" too much on the upper surface 8.

Moreover, considering that for easy actuation of the hydraulic assembly 41 through the first manual actuation member 20 it is preferable for the axis C of the hydraulic cylinder 42 to be almost parallel to the longitudinal direction of the first manual actuation member 20, the values of such a range allow correct positioning of the first manual actuation member 20 in relation to the handgrip 202 of the handlebars 200, and therefore facilitate the guiding of the bicycle and the actuation of the hydraulic equipment from the first travel condition (when the handgrip 202 is gripped).

Figure 16:
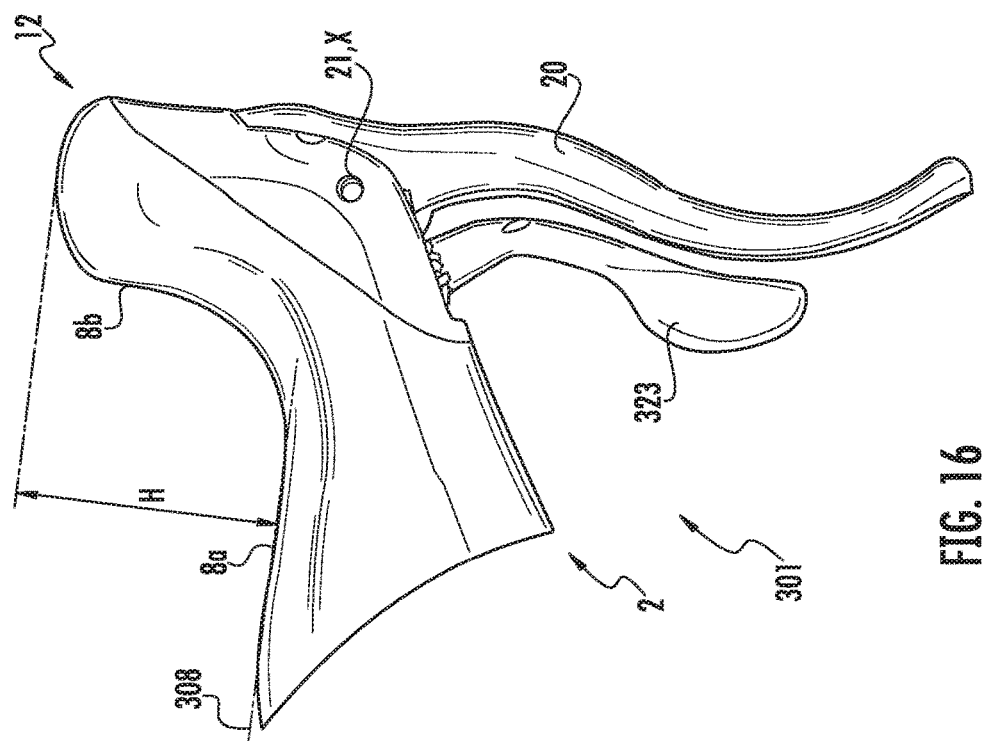
FIG. 16 illustrates the right manual control device of FIG. 13 in a side view from the distal side, highlighting a characteristic height.

FIG. 16 illustrates the right manual control device 301, in a side view from the distal side. Apart from the different configuration of the second manual actuation member 323 and 23, such a view is also representative of the right manual control device 1 of FIG. 2.

FIG. 16 highlights a height H, defined in such a side view from the distal side, but—as will be understood—also in a section through a substantially middle longitudinal plane of the manual control device 1, 301, between the tangent 308 to the upper surface 8 of the support body 2, 302 in the region 8a not involved in the protuberance 12, and the top of the protuberance 12 itself.

According to the invention, the height H is selected in the range comprised between 38 and 64 millimeters, preferably between 43 and 59 millimeters. A particularly preferred value for the height H is 50.9 millimeters.

Such values make it possible to make the protuberance 12 protruding from the region 8a of the upper surface 8a of the support body by such an amount as to allow it to be securely gripped in the aforementioned third travel condition. In particular, it is possible, by gripping the protuberance 12, to arrange one or two fingers (index finger and possibly middle finger) above the axis X defined by the pivot 21 of the first manual actuation member 20, and the others below, and thus to easily actuate the first manual actuation member 20 for example to brake. Differently, for heights H smaller than the values of such a range, the protuberance 12 would be too short and would not provide a region 8b of the upper surface of the support body 2 suitable for the palm to rest on and a secure grip, suitable for allowing the bicycle to be guided. For heights H greater than the values of such a range, the protuberance 12 would project too far up and would not be aerodynamic.

Figure 17:
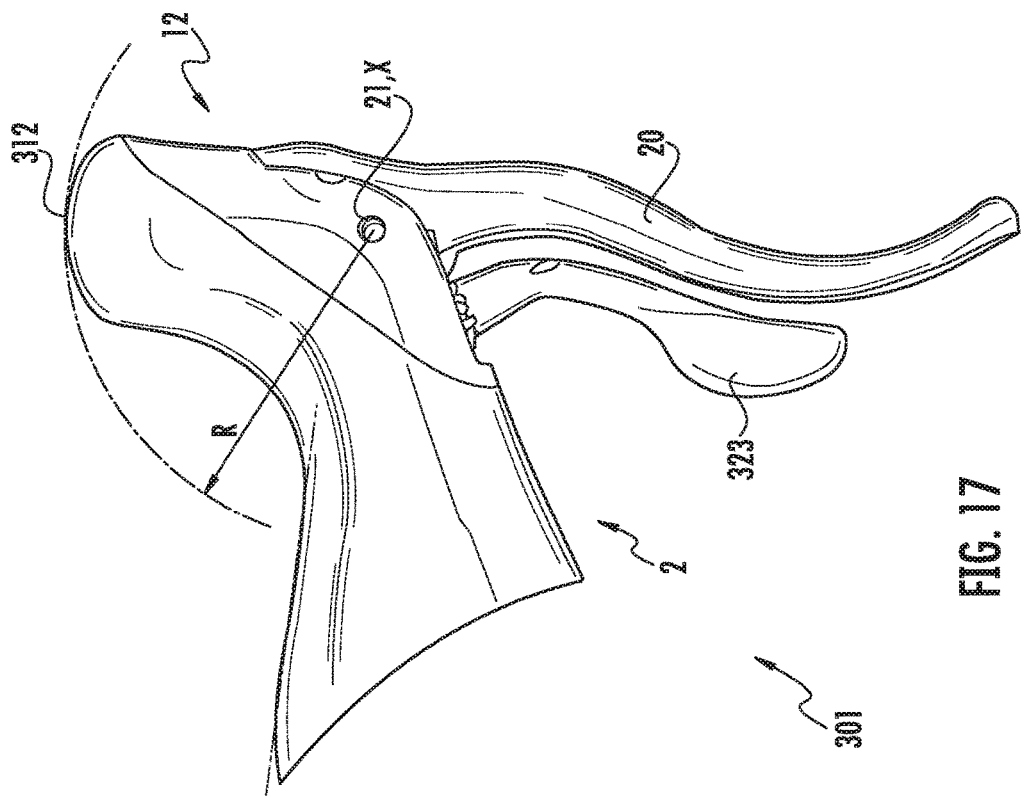
FIG. 17 illustrates the right manual control device of FIG. 13, in a side view from the distal side, highlighting a characteristic dimension.

FIG. 17 is a view analogous to that of FIG. 16.

FIG. 17 highlights a radius R that, in such a side view from the distal side, but—as will be understood—also in a section through a substantially middle longitudinal plane of the manual control device 1, 301, has its origin on the axis X defined by the pivot 21 of the first manual actuation member 20 and defines a circumference that is tangent to the top of the protuberance 12.

Preferably, such a radius is also the radius of curvature of the protuberance in a region 312 at the top thereof, as shown.

According to the invention, the radius R is selected in the range comprised between 43° and 73°, preferably between 49° and 67°. A particularly preferred value for the radius R is 58.2°.

The considerations outlined for the height H are also substantially valid for the radius R. In particular, the radius R defines the maximum distance between a finger resting on the protuberance 12 in the third travel condition, and the pivot 21 of the first manual actuation member 20, a distance that must be exceeded by at least one other finger to allow the first manual actuation member 20 to be actuated, in particular to brake, from the third travel condition by resting such other finger beneath the pivot 21.

The aforementioned values for the aforementioned characteristic magnitudes ALFA, BETA, H, R are suitable also in the case of a manual control device configured to emit only a command for a hydraulic equipment, for example a command of a hydraulic brake not integrated with a command of a gearshift—mechanical or electronic.

The above is a description of various embodiments of inventive aspects, and further changes can be made without departing from the scope of the present invention. The shape and/or size and/or location and/or orientation of the various components can be changed. The functions of a component can be carried out by two or more components and vice-versa. Components shown directly connected or contacting each other can have intermediate structures arranged between them. The details shown in a figure and/or described with reference to a figure or to an embodiment can apply in other figures or embodiments. Not all of the details shown in a figure or described in a same context have to necessarily be present in a same embodiment. Features or aspects that turn out to be innovative with respect to the prior art, alone or in combination with other features, should be deemed to be described per se, irrespective of what is explicitly described as innovative.

What is claimed is:

1. A manual control device comprising:
   a support body extending longitudinally from a first part provided for fixing to bicycle handlebars to a second part generally opposite the first part, there being generally identified on the support body a rear surface on the first part for fixing to the handlebars, a front surface on the second part, an upper surface, a bottom surface, a proximal side surface and a distal side surface, the support body having a protuberance on the second part, at the top, which can be gripped, the protuberance in the support body includes a seat for a hydraulic assembly that includes a hydraulic cylinder defining a cylinder axis (C) along which a piston slides, wherein an angle (ALFA), defined, in a section through a substantially middle longitudinal plane of the manual control device, between (i) a tangent to the upper surface of the support body in a region not involved in the protuberance and (ii) the axis (C) of the hydraulic cylinder of the hydraulic assembly is between 70° and 118°.

2. The manual control device according to claim 1, wherein a further angle (BETA), defined, in a section through a substantially middle longitudinal plane of the manual control device, between (i) a tangent to the bottom surface of the support body in a region not involved in the protuberance and (ii) the axis (C) of the hydraulic cylinder of the hydraulic assembly is between 40° and 68°.

3. The manual control device according to claim 2, wherein the further angle (BETA) is between 45° and 63°.

4. The manual control device according to claim 2, wherein the further angle (BETA) is 54.4°.

5. The manual control device according to claim 1, wherein a height (H), defined in a section through a substantially middle longitudinal plane of the manual control device, between (i) the tangent to the upper surface in the region not involved in the protuberance and (ii) the top of the protuberance itself is between 38 and 64 millimeters.

6. The manual control device according to claim 5, wherein the height (H) is between 43 and 59 millimeters.

7. The manual control device according to claim 5, wherein the height (H) is 50.9 millimeters.

8. The manual control device according to claim 1, wherein the hydraulic assembly is actuated through a manual actuation member rotatable with respect to the support body about an axis (X), wherein a radius (R) is defined in a section through the substantially middle longitudinal plane of the manual control device, and the radius (R) has an origin on the axis (X) and an arc tangential to the top of the protuberance is defined by rotation of the radius (R) between 43° and 73°.

9. The manual control device according to claim 8, wherein the radius (R) is also the radius of curvature of the protuberance in a region at the top thereof.

10. The manual control device according to claim 8, wherein the arc is between 49° and 67°.

11. The manual control device according to claim 8, wherein the arc is 58.2°.

12. The manual control device according to claim 1, wherein the manual actuation member is of the lever type.

13. The manual control device according to claim 1, wherein the support body has a cavity arranged more on the first part than on the second part, wherein a switch is provided in the cavity, and a manual actuation member is arranged more on the second part than on the first part, a transmission mechanism being provided arranged between the manual actuation member and the switch, the transmission mechanism comprising a shaft rotatably supported in the support body.

14. The manual control device according to claim 1, wherein the support body has, at the seat for the hydraulic assembly, a projection projecting towards the outside of the support body beyond the hydraulic assembly when seated and in particular projecting upwards.

15. The manual control device according to claim 14, wherein the projection is hook shaped and also acts as a hooking for a removable cover of the support body.

16. The manual control device according to claim 1, further comprising a removable cover of the support body that is provided with a thickening or with an inner padding at its contact region with the hydraulic assembly.

17. The manual control device according to claim 1, wherein said hydraulic assembly controls a hydraulic brake.

18. The manual control device according to claim 1, wherein said device is configured to control a gearshift of the bicycle or an electromechanical derailleur thereof or a cycle-computer.

19. The manual control device according to claim 1, wherein a second manual actuation member in the form of a lever is provided for actuating the hydraulic assembly, and the manual actuation member is partially housed in the second manual actuation member, preferably also in actuation conditions of the second manual actuation member.

20. The manual control device according to claim 1, wherein the angle (ALFA) is between 80° and 108°.

21. The manual control device according to claim 1, wherein the angle (ALFA) is 94°.

* * * * *